(12) United States Patent
Zhou

(10) Patent No.: US 7,584,444 B2
(45) Date of Patent: Sep. 1, 2009

(54) SYSTEM AND METHOD FOR EXTERNAL-MEMORY GRAPH SEARCH UTILIZING EDGE PARTITIONING

(75) Inventor: Rong Zhou, San Jose, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 170 days.

(21) Appl. No.: 11/612,523

(22) Filed: Dec. 19, 2006

(65) Prior Publication Data

US 2008/0143723 A1 Jun. 19, 2008

(51) Int. Cl.
G06F 17/50 (2006.01)
G06F 7/60 (2006.01)
G06T 11/20 (2006.01)
G06T 1/00 (2006.01)
G09G 5/00 (2006.01)

(52) U.S. Cl. .................. 716/7; 703/1; 703/2; 703/6; 703/16; 345/619; 345/440; 345/418

(58) Field of Classification Search ............ 716/7; 703/1, 2, 6, 14; 345/619, 440, 418
See application file for complete search history.

(56) References Cited

U.S. PATENT DOCUMENTS 6,346,879 B1 * 2/2002 Peled ................. 340/500

2005/0137839 A1 * 6/2005 Mansurov ............... 703/13
2006/0274070 A1 * 12/2006 Herman et al. ........... 345/474

OTHER PUBLICATIONS

Korf, "Best-First Frontier Search With Delayed Duplicate Detection", *National Conference on Artificial Intelligence, American Association for Artificial Intelligence*, 2004; pp. 650-657.
Edelkamp et al., "External A", *Proceedings of the 27th German Conference on Artificial* Intelligence, pp. 226-240, 2004.
Munagala et al., "I/O-Complexity of Graph Algorithms", *Proceedings of 10 Symposium on Discrete Algorithms*, pp. 687-694, 1999.

(Continued)

*Primary Examiner*—Phallaka Kik
(74) *Attorney, Agent, or Firm*—Fay Sharpe LLP

(57) ABSTRACT

A method and system is provided for generator successor nodes in an external-memory search of a graph having a plurality of nodes and outgoing edges of the plurality of nodes. The method and system includes construction of an abstract representation of the graph to include a set of abstract nodes and abstract outgoing edges of the abstract set of nodes. The edges of the graph are partitioned based on the abstract representation of the graph. The partitioning includes grouping edges (or instantiated operators of a search problem) that map to the same abstract edge of the abstract representation together as isomorphic edges. Successor nodes along outgoing edges that belong to the same group are generated consecutively. By this design, partial and incremental expansion of nodes can be achieved in order to limit the number of time-consuming I/O (or other communication) operations in search algorithms that take advantage of the memory hierarchy in a computer system, such as those that use disk storage.

27 Claims, 10 Drawing Sheets

OTHER PUBLICATIONS

Stern, et al., "Using Magnetic Disk Instead of Main Memory in the Murϕ Verifier", *Proceedings of 10th International Conference on Computer-Aided Verification*, pp. 172-183, 1998.

Zhou, et al., "Structured Duplicate Detection in External-Memory Graph Search," *Proceeding of the 19th National Conference on Artificial Intelligence* (AAAI-04), Jul. 25-29, 2004; pp. 683-688.

Zhou et al., "Breadth-First Heuristic Search", *Artificial Intelligence*, 170 (4-5): 385-408, 2006.

Zhou et al., "Domain-Independent Structured Duplicate Detection", *Proceedings of the 21st National Conference on Artificial Intelligence* (AAAI-06), pp. 1082-1087, 2006.

Mehlhorn et al., "External-Memory Breadth-First Search with Sublinear I/O", *Proceedings of 10th Annual European Symposium on Algorithms*, pp. 723-735, 2002.

\* cited by examiner

| PROBLEM | SDD | | | | SDD + EDGE PARTITIONING | | | |
|---|---|---|---|---|---|---|---|---|
| | RAM | DISK | EXP | SECS | RAM | DISK | PPARTIAL EXP | SECS |
| DEPOTS-7 | 2,662,253 | 9,524,314 | 16,801,412 | 342 | 742,988 | 10,705,324 | 191,263,008 | 460 |
| BLOCKS-16 | 3,194,703 | 5,527,227 | 18,075,779 | 387 | 1,069,901 | 6,997,695 | 395,738,702 | 823 |
| TRUCKS-9 | 7,085,621 | 20,888,173 | 54,348,820 | 3,995 | 953,642 | 26,106,523 | 590,454,354 | 5,982 |
| STORAGE-12 | 5,520,445 | 230,451,662 | 282,931,334 | 9,141 | 891,585 | 221,072,558 | 2,914,075,502 | 9,071 |
| FREECELL-4 | 11,447,191 | 114,224,688 | 208,743,830 | 14,717 | 2,218,545 | 122,033,806 | 4,206,478,527 | 23,712 |
| ELEVATOR-15 | 1,540,657 | 126,194,100 | 430,804,933 | 16,487 | 61,900 | 127,685,640 | 12,775,795,015 | 60,229 |
| GRIPPER-10 | 13,736,629 | 328,271,632 | 2,007,116,254 | 35,052 | 1,069,901 | 340,780,440 | 13,366,646,793 | 36,377 |
| LOGISTICS-9 | 5,159,767 | 540,438,586 | 1,138,753,911 | 41,028 | 742,988 | 544,285,237 | 9,856,519,138 | 49,956 |
| DRIVERLOG-13 | 49,533,873 | 2,147,482,093 | 2,766,380,501 | 108,051 | 4,299,806 | 2,147,483,535 | 38,879,000,039 | 122,877 |
| SATELLITE-7 | 12,839,146 | 571,912,557 | 838,488,709 | 160,687 | 429,971 | 584,308,516 | 28,532,162,097 | 129,608 |
| TRUCKS-10 | | | | | 7,085,621 | 231,515,502 | 6,282,870,888 | 70,963 |
| DEPOTS-10 | | | | | 41,278,228 | 1,373,427,385 | 26,548,426,036 | 90,644 |

FIG. 11

SYSTEM AND METHOD FOR EXTERNAL-MEMORY GRAPH SEARCH UTILIZING EDGE PARTITIONING

BACKGROUND

The present application is directed to search algorithms, and more particularly to external-memory graph searches.

Searching a graph of combinatorial possibilities is a central technique in areas such as planning, combinatorial optimization, and model checking. For many problems in these areas, a bottleneck in the graph searching process is availability of internal memory of a computer system, such as random access memory (RAM). Therefore, there is currently interest in using external memory, such as disk storage, to improve the scalability of graph-search algorithms. However, it is also known that access to external memory, such as disk storage, is magnitudes slower than to RAM. To limit the number of slow disk input/output (I/O) operations, two particular approaches have been developed to improve the efficiency of graph-search algorithms: delayed duplicate detection (DDD) and structured duplicate detection (SDD).

There are a number of different types of algorithms used to perform graph searching, including Breadth-first search algorithms, uniform-cost search (e.g., Dijkstra's) algorithms, best-first search (e.g., A*) algorithms, among others. These and other related graph-search algorithms store generated nodes in memory in order to be able to detect duplicates and prevent node regeneration. The scalability of these graph-search algorithms can be dramatically increased by storing nodes in external memory, such as disk storage. However, as previously noted, because random access to a disk is several orders of magnitude slower than random access to an internal memory (e.g., RAM), benefits are obtained when external-memory graph search algorithms use duplicate-detection strategies that serialize disk access in a way that minimizes disk I/O, such as by delayed duplicate detection (DDD) and structured duplicate detection (SDD).

Turning to FIG. 1, illustrated is a graph 10, to which duplicate detection (DDD) 12 is applied. In its original and simplest form, delayed duplicate detection (DDD) expands a set of nodes (e.g., the nodes on a search frontier) 14 without checking for duplicates, and stores the generated nodes (including duplicates) in a disk file (or files) 16. The file of nodes is then sorted 18 and duplicates are removed 20. Thereafter, closed nodes are removed 22. In this case, the closed nodes (i.e., the Closed list) are nodes 1, 2, and 3. In keeping with its use by theoretical computer scientists in analyzing the complexity of external-memory graph search, DDD makes no assumptions about the structure of the search graph (except that it is undirected and unweighted). Although in certain special cases DDD may be applicable to directed and weighted graphs (such as the lattice graph of multiple sequence alignment), it requires the graph having a particular kind of structure that many graphs don't have.

Recent work shows that the performance of external memory graph searching can be significantly improved by exploiting the structure of a graph in order to localize memory references. In particular, the structured duplicate detection (SDD) technique exploits local structure captured in an abstract representation of a state-space graph. For graphs with sufficient local structure, structured duplicate detection (SDD) outperforms delayed duplicate detection (DDD) because it never generates duplicates, even temporarily, and thus has lower overhead and reduced complexity. It has also been shown that it is possible to use similar local structure in order to improve the performance of delayed duplicate detection (DDD).

Although approaches that exploit a graph's local structure are effective, they depend on a graph-search problem having the appropriate kind and sufficient amount of local structure in order to be effective. Thus a question arises as to whether these approaches will be equally effective for all graphs, or effective at all for some graphs.

INCORPORATION BY REFERENCE

The following patents/applications, the disclosures of each being totally incorporated herein by reference are mentioned:

S. Edelkamp, S. Jabbar, and S. Schrödl, "External A*", Proceedings of the 27th German Conference on Artificial Intelligence, pages 226-240, 2004;

R. Korf, "Best-First Frontier Search with Delayed Duplicate Detection", Proceedings of the 19th National Conference on Artificial Intelligence (AAAI-04), pages 650-657, 2004;

K. Mehlhorn and U. Meyer, "External-Memory Breadth-First Search with Sublinear I/O," Proceedings of the 10th Annual European Symposium on Algorithms, pages 723-735, 2002;

K. Munagala and A. Ranade, "I/O-Complexity of Graph Algorithms," Proceedings of 10th Symposium on Discrete Algorithms, pages 687-694, 1999;

U. Stern and D. Dill, "Using Magnetic Disk Instead of Main Memory In The Mur(phi) Verifier," Proceedings of 10th International Conference on Computer-Aided Verification, pages 172-183, 1998;

R. Zhou and E. Hansen, "Structured Duplicate Detection in External-Memory Graph Search", Proceedings of the 19th National Conference on Artificial Intelligence (AAAI-04), pages 683-688, 2004;

R. Zhou and E. Hansen, "Breadth-First Heuristic Search," Artificial Intelligence, 170(4-5):385-408, 2006; and R. Zhou and E. Hansen, "Domain-Independent Structured Duplicate Detection," Proceedings of the 21st National Conference on Artificial Intelligence (AAAI-06), pages 1082-1087, 2006.

BRIEF DESCRIPTION

A method and system is provided for generating successor nodes in an external-memory search of a graph having a plurality of nodes and edges. The method and system includes construction of an abstract representation of the graph, called an abstract (state-space) graph, that includes a set of abstract nodes and abstract edges. The edges of the graph are partitioned based on the abstract representation of the graph. The partitioning includes grouping edges (or instantiated operators) that map to the same abstract edge of the abstract graph together as isomorphic edges. Successor nodes along outgoing edges that belong to the same group (i.e., isomorphic edges) are generated consecutively for a set of nodes that all map to the same abstract node. By this design, partial and incremental expansion of nodes can be achieved in a way that significantly reduces the number of disk I/O operations or communication overhead across different (and possibly multiple) levels of the memory hierarchy in a computer system.

BRIEF DESCRIPTION OF THE DRAWINGS

FIG. 11 illustrates results of the use of edge partitioning under various conditions.

DETAILED DESCRIPTION

The following discussion discloses an edge partitioning system and method that exploits a different kind of local structure than is exploited in existing systems and methods. The kind of local structure exploited herein is in a sense created by the way nodes are expanded, in particular, by a form of partial and incremental node expansion.

The disclosed edge partitioning acts to localize memory references in any graph, no matter what its structure, including a fully-connected graph. Moreover, the manner in which edge partitioning localizes memory references complements the kind of local graph structure that is exploited by previous duplicate-detection approaches (e.g., DDD; SDD). This allows edge partitioning to be combined with previously-developed approaches in order to create a more powerful external-memory graph-search algorithm with substantially improved performance.

1. Overview of Edge Partitioning in External-Memory Graph Search

A concept of edge partitioning is to partition the set of out-going edges for a set of nodes, such that only a subset of these outgoing edges are used to generate successors for the set of nodes at a time. When used in conjunction with delayed duplicate detection (DDD), this allows earlier detection of duplicate nodes, which saves disk space and possibly time. When used with structured duplicate detection (SDD), it leads to smaller duplicate-detection scopes, which correspond to lower RAM requirements. The edge partitioning process described herein include: (i) partitioning the set of edges (also called instantiated operators) based on an abstract representation of the search graph, and (ii) using isomorphic edges (i.e., edges that map to the same abstract edge) to generate successors for a set of nodes, by expanding nodes partially and incrementally, which means by generating only some of the successors of a node at a time, and generating the other successors at a later time (e.g., in a sequential manner).

Figure 1:
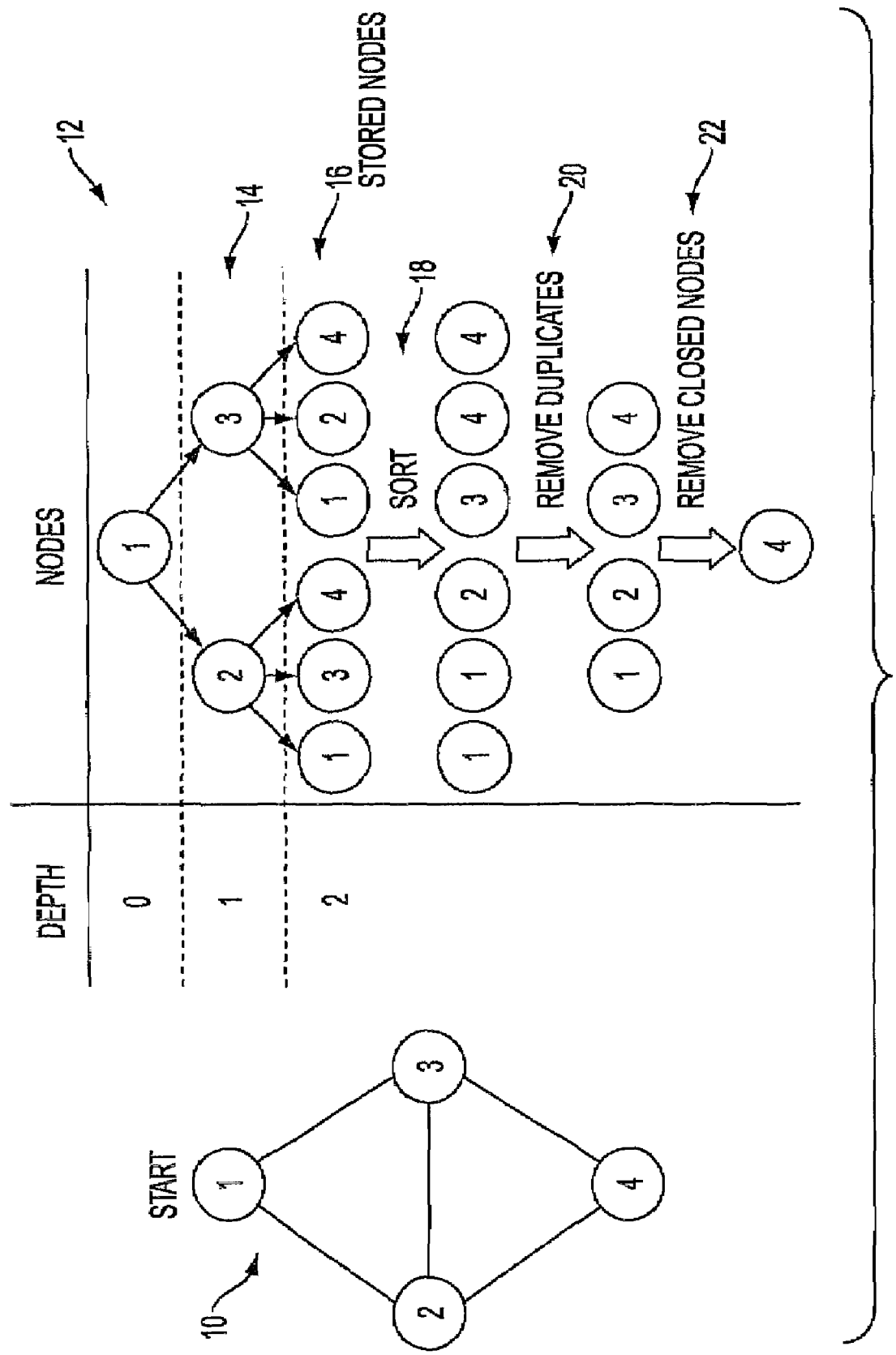
FIG. 1 depicts a graph which is to be searched, and a delayed duplicate detection (DDD) process which may be used.
Figure 2:
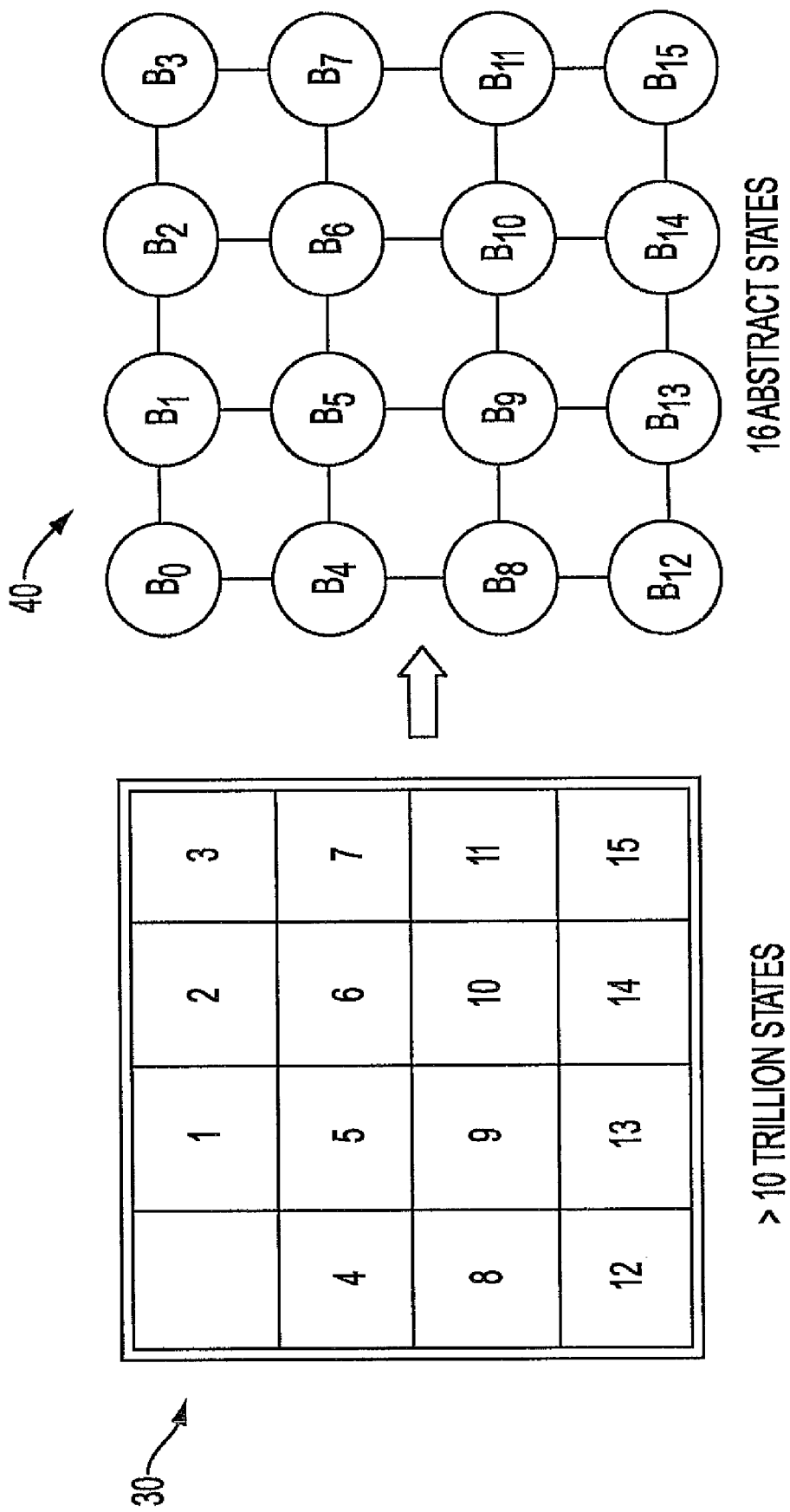
FIG. 2 illustrates an abstract state-space graph created by a state-space projection function from the state-space graph of a problem.

A general procedure for creating a state-space projection function, used to create an abstract state-space graph, is to ignore one or more state variables in the original problem (i.e., graph). Thus, a state-space projection function is a many-to-one mapping (i.e., one abstract node corresponds to a set of states in the original state space). For example, two abstract nodes y and y' are connected by an abstract edge (or abstract operator) if and only if (i) there exist a pair of states x and x' such that y and y' are the images of x and x' under the state-space projection function, respectively, and (ii) x' is a direct successor of x in the original state space. This concept is illustrated in FIG. 2, which shows the "Fifteen Puzzle" 30, having over 10 trillion potential states. By application of a state-space projection function, abstract state-space graph 40 is created with 16 abstract states ($B_0$-$B_{15}$), when only the position of the blank space is considered.

Figure 3:
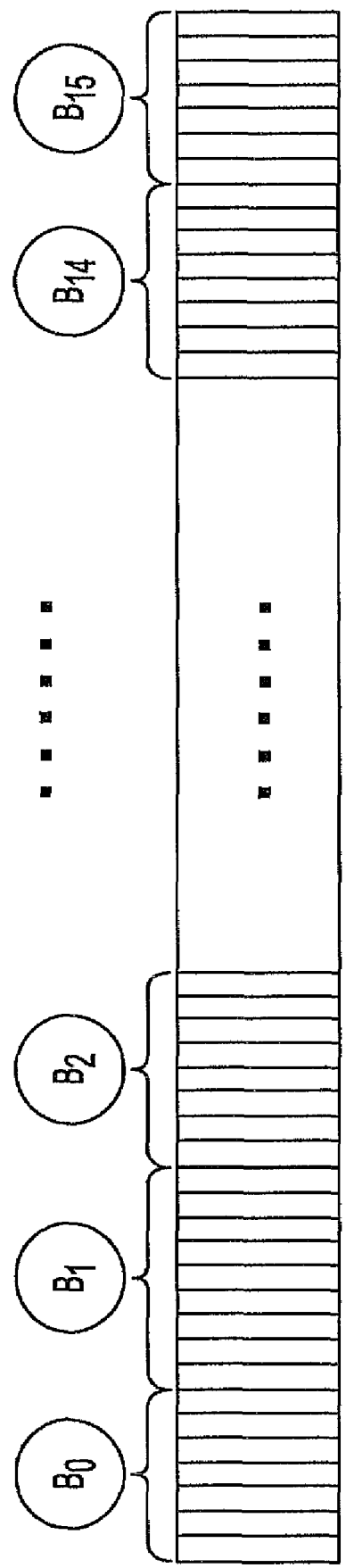
FIG. 3 illustrates Open and Closed lists partitioned into blocks of nodes, with one block for each abstract node in an abstract state-space graph.

An abstract state-space graph reveals local structure in the original problem that can be exploited, even without application of the edge partitioning concepts, by both DDD and SDD to limit disk input/output (I/Os) operations. For example, DDD can use this information to detect duplicates earlier in the process. This can be achieved by grouping nodes into buckets such that nodes in the same bucket map to the same abstract node. For example, Open and Closed lists may be partitioned into blocks (or buckets) of nodes, with one block for each abstract node in the abstract state-space graph, as shown for example in FIG. 3. Then DDD can easily tell if all the nodes that could be predecessors of nodes in a bucket are expanded, and, if so, DDD can remove duplicates in that bucket before all the nodes in a layer of the graph are expanded. This process acts to reduce the amount of external memory needed by DDD during a search, and can result in a faster search.

Figure 4:
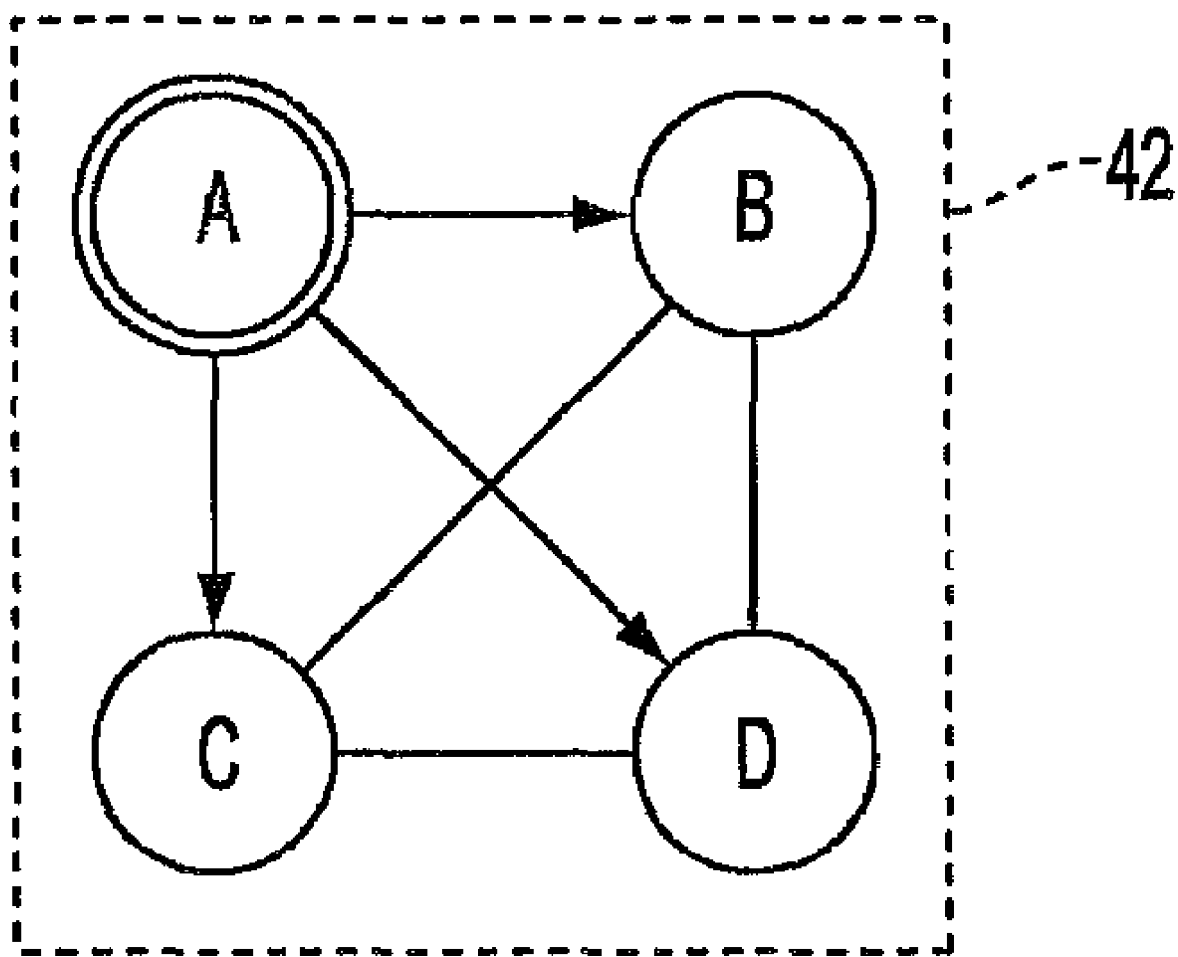
FIG. 4 depicts a fully connected abstract state-space graph (the dotted square encloses the scope in which to check for duplicates of successors of nodes that map to abstract node A with self-loops omitted for clarity)

However, when the abstract graph is a fully connected abstract graph, such as abstract graph 42 of FIG. 4, detecting duplicates earlier in DDD cannot be accomplished, because the condition for doing so is only satisfied when all nodes in a layer of the graph are expanded. In this situation, edge partitioning of the present application is used to enable earlier duplicate detection in DDD. Particularly, when nodes in a bucket are generating successors that fall into one bucket, they may also generate successors that fall into other buckets. A concept of edge partitioning is to have all the predecessor buckets generate successors that fall into the same bucket before they do so for other successor buckets. By this design, earlier duplicate detection will be applicable even if the abstract graph is fully connected.

Figure 5:
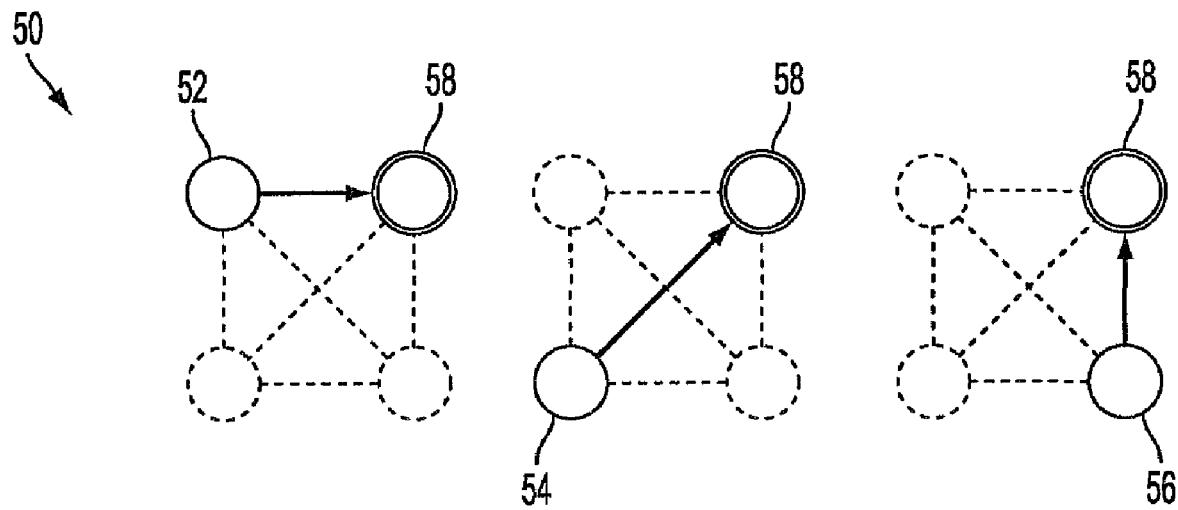
FIG. 5 illustrates a sequence of edge partitioning operations employed in a delayed duplicate detection process.

FIG. 5 depicts an example of how edge partitioning enables earlier duplicate detection in DDD when abstract graph 50 is a $K_4$ abstract graph (i.e., a fully connected abstract graph with 4 nodes). Supposing that DDD is used to detect duplicates earlier on nodes that map to abstract node (shown in double circles) 58. Using edge partitioning, the algorithm which is used is restricted so as to only generate successor nodes that map to abstract node 58, and not other abstract nodes. Therefore, by the time the expansions of all nodes that map to one of the predecessors of the abstract node 58 are finished, earlier duplicate detection in DDD can be performed to reduce the number of nodes stored on disk. Although under these concepts a node needs to be expanded multiple times to generate all its successors, each node expansion is cheaper because only a subset of edges (or instantiated operators) are used in a "partial and incremental expansion" and each subset is determined in advance to reduce the runtime overhead.

For SDD, since duplicate detection is performed as soon as a node is generated, earlier duplicate detection is not an issue. However, if the abstract graph is a fully connected graph, every duplicate detection scope must include all stored nodes. This means SDD must retain all nodes in RAM and cannot store any node on disk. But when edge partitioning of the present application is used, SDD can focus on removing duplicates in one bucket of nodes at a time, which thereby bounds the maximum size of any duplicate-detection scope to the size of the largest bucket. Thus, if all buckets are about the same size, edge partitioning can reduce the RAM requirements of SDD by approximately a factor of the maximum number of successors of any node in the abstract graph, and, in the case of a fully connected abstract graph, this factor is the total number of abstract nodes.

Figure 6:
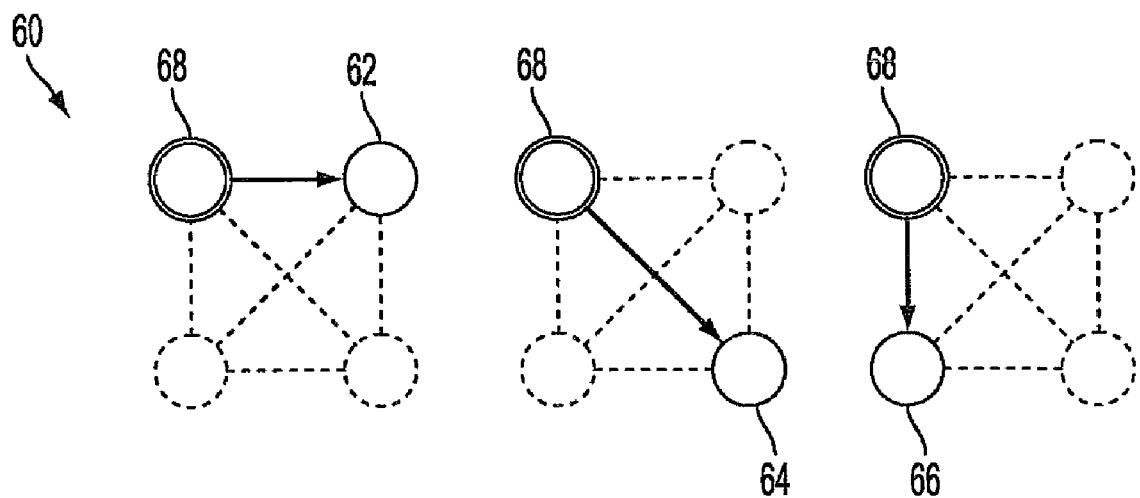
FIG. 6 illustrates a sequence of edge partitioning operations employed in a structured duplicate detection process.

FIG. 6 illustrates how edge partitioning is used with SDD to shrink the duplicate-detection scope in $K_4$ abstract graph 60 for the bucket of nodes that map to the abstract node shown with double circles 68. Prior to the use of edge partitioning, all stored nodes would have needed to be kept in RAM in the fully-connected abstract graph. With edge partitioning, only nodes that map to a single abstract node (i.e., solid circle nodes 62-66) need to be kept in RAM at a time. FIG. 6 also shows that the successor nodes are generated in three passes, one for each abstract successor node.

Figure 7:
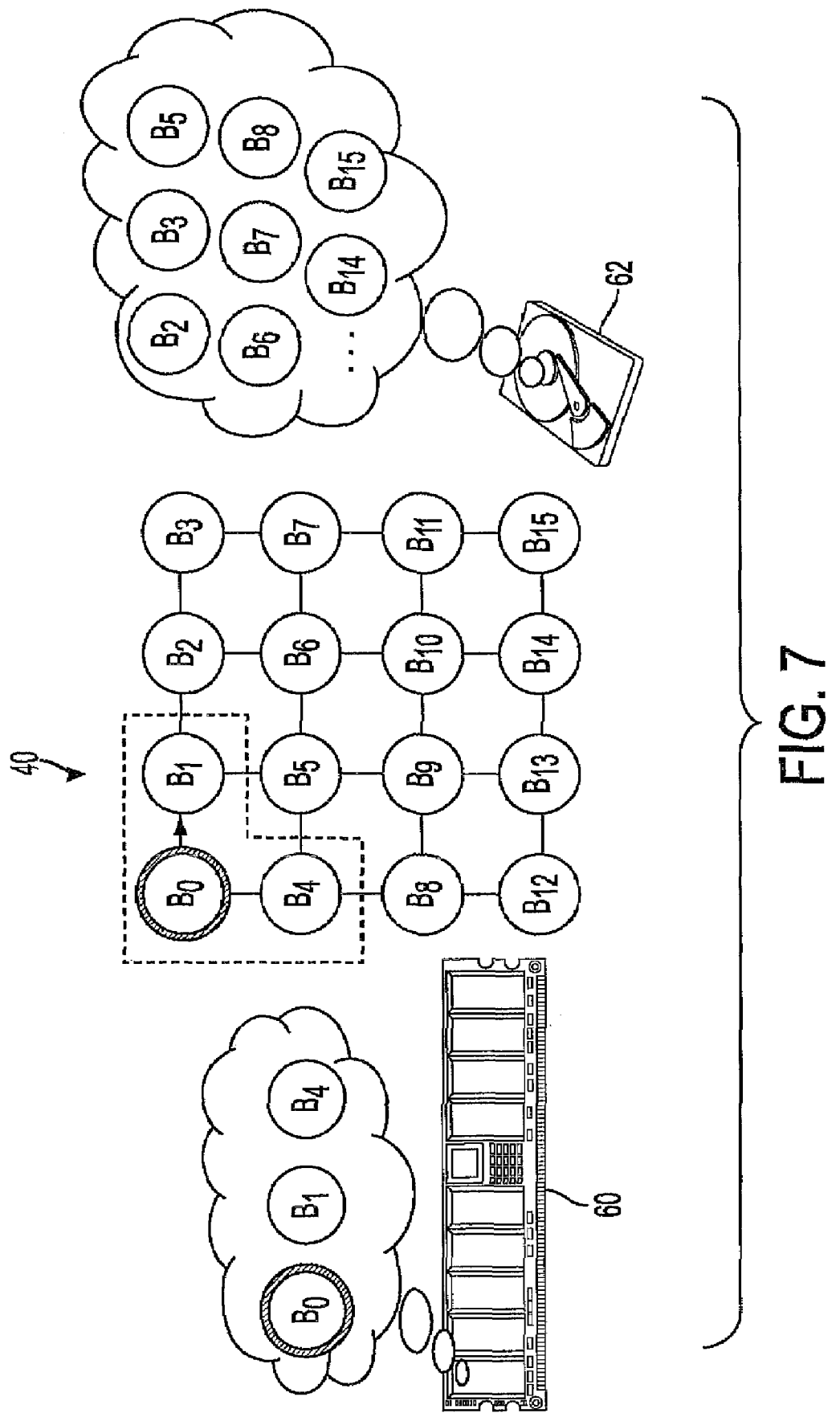
FIG. 7 illustrates the concept of a duplicate detection scope for structured duplicate detection, where a set of blocks (of stored nodes) are guaranteed to contain all stored successors of a set of nodes currently being expanded (note that nodes outside the duplicate-detection scope can be stored on disk without compromising duplicate detection)
Figure 8:
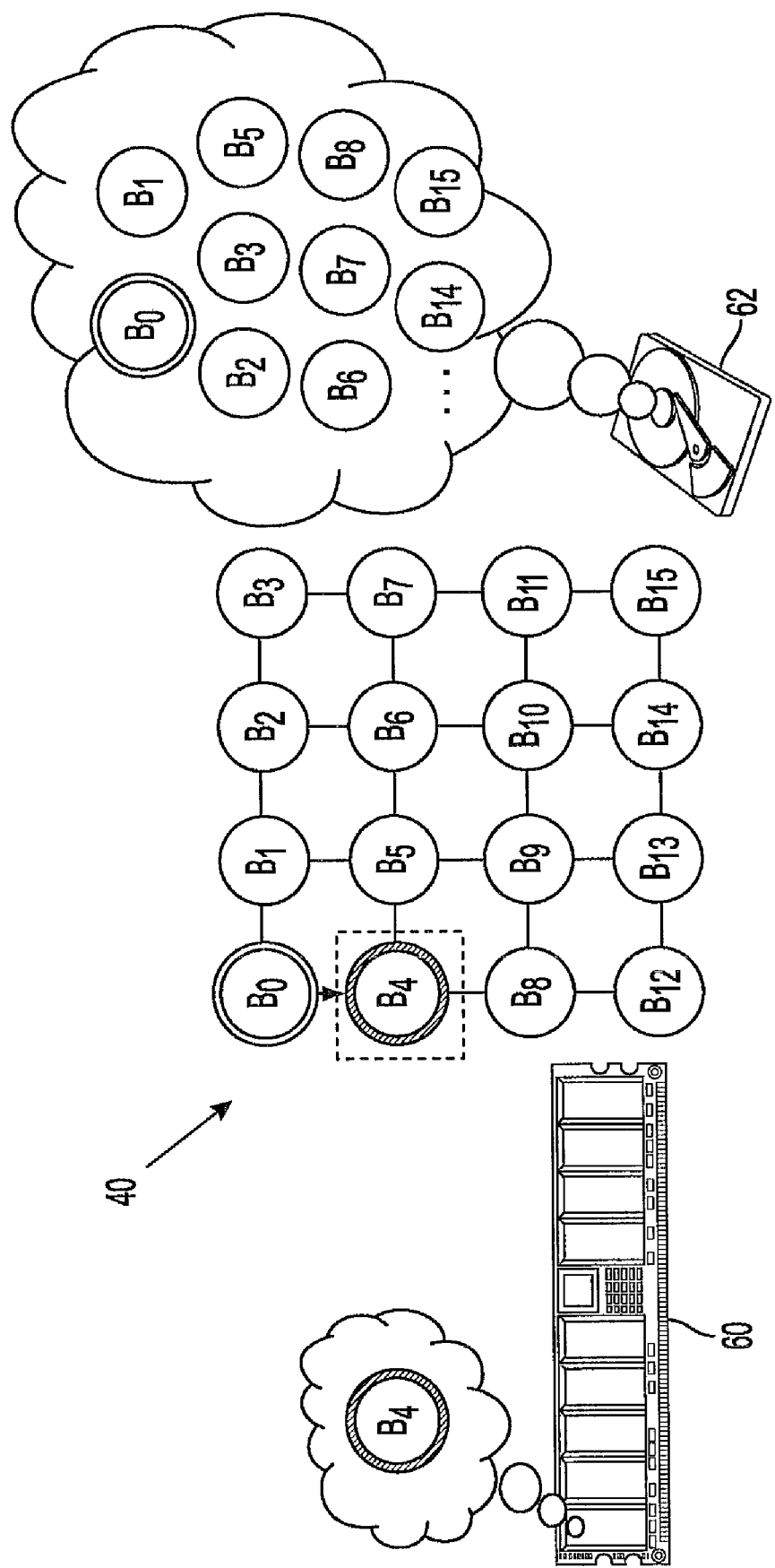
FIG. 8 depicts a reduced duplicate-detection scope to a single block of stored nodes when employing edge partitioning.

Another view of this "duplicate-detection scope" concept is shown in FIG. 7, which refers back to the Fifteen Puzzle abstract graph 40 of FIG. 2. In FIG. 7, nodes that map to abstract node $B_o$ are being expanded. The potential successor abstract nodes are abstract nodes $B_1$ and $B_4$, which are stored in internal memory 60, and the remainder of the abstract nodes $B_2$, $B_3$ and $B_5$-$B_{15}$ are stored in external memory (e.g., disk) 62. Therefore, using SDD alone, the duplicate detection scope of nodes that map to $B_0$ includes those nodes that map to either abstract node $B_1$ or $B_4$. FIG. 8, on the other hand, illustrates that when edge partitioning is used, the duplicate detection scope is reduced to one block of stored nodes, (e.g., $B_4$) in the internal memory, while the remaining nodes (e.g., $B_0$-$B_3$ and $B_5$-$B_{15}$) are stored in external memory (e.g., disk) during node expansion operations.

2. External-Memory Graph Search 2.1 Delayed Duplicate Detection

Turning now to a more detailed description of the present concepts, as a general approach to external-memory graph search, delayed duplicate detection (DDD) avoids excessive disk I/O by alternating between two phases; successor generation and duplicate elimination. Depending on how duplicates are eliminated, there are two forms of DDD, which are described below.

Sorting-Based DDD: The first algorithms for external-memory graph search used sorting-based DDD, which (i) takes a file of nodes on the search frontier, (e.g., the nodes in a frontier layer of a breadth-first search graph); (ii) generates their successors and writes them to another file without checking for duplicates; (iii) sorts the file of generated nodes by the state representation so that all duplicate nodes are adjacent to each other; and (iii) scans the file to remove duplicates. The I/O complexity of this approach is dominated by the I/O complexity of external sorting, and experiments confirm that external sorting is the most expensive step of sorting-base DDD.

Hash-Based DDD: Hash-based DDD is a more efficient form of DDD. To avoid the I/O complexity of external sorting in DDD, it uses two orthogonal hash functions. During node expansion, successor nodes are written to different files based on the value of the first hash function, which means all duplicates are mapped to the same file. Once a file of successor nodes has been fully generated, duplicates can be removed. To avoid the overhead of external sorting in removing duplicates, a second hash function maps all duplicates to the same location of a hash table, which accomplishes by hashing what otherwise would require sorting. But since the hash table corresponding to the second hash function must fit in internal memory, hash-based DDD has a minimum internal-memory requirement that corresponds to the largest set of unique nodes in any file. Thus, this approach requires some care in designing the first hash function to make sure it does not map too many unique nodes to a single file.

Although hash-based DDD in its original form does not depend on, or leverage, the structure of a graph, an important improvement, called "interleaving expansion and merging", does. It works as follows The nodes on the search frontier are stored in multiple files, called "parent files," depending on the first hash function, and the successor nodes that are generated when the nodes in the parent files are expanded are also stored in multiple files, called "child files." Instead of waiting until all parent files at a given depth are expanded before merging any child files at the next depth to remove duplicates, a child file is merged as soon as all parent files that could possibly add successor nodes to it have been expanded. In other words, interleaving expansion and merging makes it possible to remove duplicates earlier. As a result, DDD only needs to store approximately the maximum number of distinct nodes at any depth. If "b" is the average branching factor, this reduces the amount of external memory used by hash-based DDD by about a factor of "b".

To allow "interleaving expansion and merging," the first hash function must be designed in such a way that it captures local structure in the search graph. In particular, a child file must only contain successor nodes generated from a small number of parent files. A generic hash function cannot be used for this since it will typically hash nodes uniformly across all files. Instead, a problem-specific hash function must be designed. The type of local structure the hash function needs will be discussed in a following section of the document.

2.2 Structured Duplicate Detection

As mentioned, structured duplicate detection leverages local structure in a graph to partition stored nodes between internal memory and a disk in such a way that duplicate detection can be performed immediately, during node expansion, so no duplicates are generated. The local structure that is leveraged by this approach is revealed by a state-space projection function, which is a many-to-one mapping from the original state space to an abstract state space, in which each abstract state (i.e., abstract node) corresponds to a set of states (i.e., nodes) in the original state space.

Figure 9:
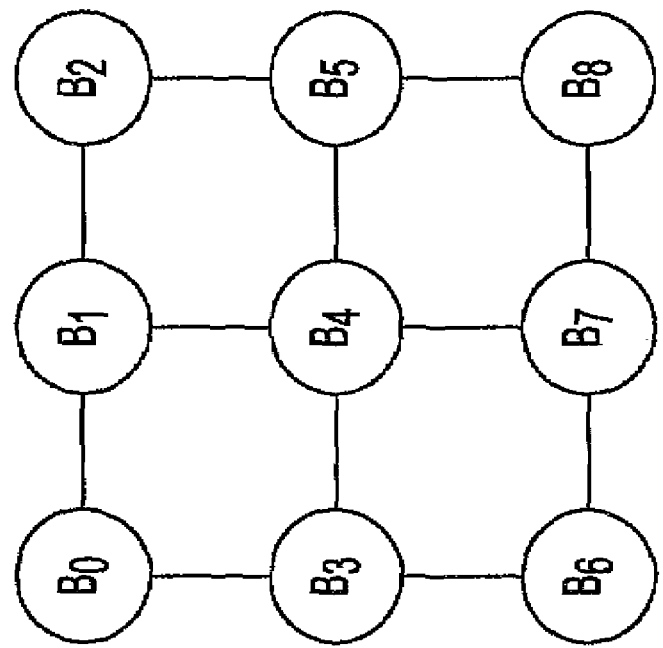
FIG. 9 illustrates an "Eight Puzzle" panel with all possible positions of a blank for the Eight Puzzle, and an abstract state-space graph created by a state-space projection function that considers the position of the "blank" only.
Figure 9:

If a state x is mapped to an abstract state y, then y is called the image of x. A state-space projection function is created by ignoring some state variables. For example, if the positions of all tiles in the Eight Puzzle 70 of FIG. 9 are ignored and only the position of the "blank", is considered, an abstract state space 72 is obtained that has only nine abstract states ($B_0$-$B_8$), one corresponding to each possible position of the blank. The Eight-Puzzle is used in this discussion (opposed to the Fifteen Puzzle) for convenience of explanation.

Given a state-space graph and state-space projection function, the abstract state-space graph may be constructed as follows. The set of nodes, called abstract nodes (e.g., $B_0$-$B_8$), in the abstract graph (e.g., 72) corresponds to the set of abstract states. An abstract node y' is a successor of an abstract node y if and only if there exist two states x' and x in the original state space, such that (i) x' is a successor of x, and (ii) x' and x map to y' and y, respectively, under the state-space projection function.

The abstract state-space graph 72 created by the simple state-space projection function maps a state into an abstract state based only on the position of the blank. Therefore, each abstract node $B_i$ in FIG. 9 corresponds to the set of states with the blank located at position i of the Eight Puzzle 70.

In structured duplicate detection, stored nodes in the original search graph are divided into "nblocks" with each nblock corresponding to a set of nodes that map to the same abstract node. Given this partition of stored nodes, structured duplicate detection uses the concept of duplicate-detection scope to localize memory references in duplicate detection. The duplicate-detection scope of a node x in the original search graph is defined as all stored nodes (or equivalently, all nblocks) that map to the successors of the abstract node y that is the image of node x under the projection function. In the Eight Puzzle example, the duplicate-detection scope of nodes that map to abstract node $B_0$ consists of nodes that map to abstract node $B_1$ and those that map to abstract node $B_3$.

The concept of duplicate-detection scope allows a search algorithm to check duplicates against a fraction of stored nodes, and still guarantee that all duplicates are found. An external-memory graph-search algorithm can therefore use RAM to store nblocks within the current duplicate-detection scope, and use disk to store other nblocks when RAM is full.

Like DDD, SDD is designed to be used with a search algorithm that expands a set of nodes at a time, such as breadth-first search, where the order in which nodes in the set are expanded can be adjusted to minimize disk I/O. SDD's strategy for minimizing disk I/O is to order node expansions such that changes of duplicate-detection scope occur as infrequently as possible, and, when they occur, they involve change of as few nblocks as possible. When RAM is full, nblocks outside the current duplicate-detection scope are flushed to disk. Writing the least-recently used nblocks to disk is one way to select which nblocks to write to disk. When expanding nodes in a different nblock, any nblocks in its duplicate-detection scope that are stored on disk are swapped into RAM.

3. Edge Partitioning

The kind of local structure that is exploited by SDD is captured in an abstract state-space graph when the maximum outdegree (i.e., the number of outward directed graph edges from a given graph vertex in a directed graph) of any abstract node is small relative to the total number of abstract nodes, since the largest outdegree of any abstract node reflects the largest duplicate-detection scope. Experiments in several domains suggest that this form of local structure is present in many search problems. However it is present in varying degrees, and there is no guarantee that it is present in every search problem. Moreover, the degree to which it is present can affect the degree of scalability that is possible.

To address this issue, a technique has been developed that makes SDD effective regardless of whether, and to what degree, this kind of local structure is present. In fact, the edge partitioning, being disclosed herein, is effective even if the abstract state-space graph is fully-connected. A concept behind edge partitioning is that the local structure (also exploited by SDD) can be created, in some sense, by expanding nodes partially and incrementally, that is by generating only some of the successors of a node at a time, and generating the other successors later. This technique can also be viewed as an extension of the method of abstraction that is used to capture local structure from the state space to the operator space of a search problem.

Like SDD, edge partitioning uses a state-space projection function to partition the set of stored nodes into nblocks, one for each abstract node in the abstract graph. Unlike SDD, edge partitioning also uses operator grouping to further divide the set of outgoing edges of each nblock. The following discussion will explain operator grouping. Then a description will be given on how edge partitioning can be used in structured duplicate detection, as well as in the "interleaving expansion and merging" step of hash-based DDD.

3.1 Operator Grouping

Before discussing operator grouping in detail, it is pointed out that an "operator" here refers to an instantiated (or grounded) operator. For example, the Eight Puzzle has a total of 192 grounded operators, even though there are only four (left, right, up, and down) operators prior to instantiation.

Operator grouping in edge partitioning is built on top of state abstraction. In this example, $\mathcal{O}$ will be the set of all instantiated operators of a search problem. An operator $o \in \mathcal{O}$ is applicable to an abstract node y if and only if there exists a state x in the original state space, such that (i) o is applicable to x, and (ii) x maps to y. Consider the Eight Puzzle. There are $2 \times 8 = 16$ operators that are applicable to abstract node $B_0$, because the blank, when located at the top-left corner of the puzzle board, can move either right ($B_0 \to B_1$) or down ($B_0 \to B_3$), and each move has 8 different instantiations, depending on which tile of the Eight Puzzle is moved into the blank position. Similarly, each of the abstract nodes $B_2, B_6$, and $B_8$ has 16 applicable operators. Abstract nodes $B_1; B_3; B_5$, and $B_7$ each have $3 \times 8 = 24$ applicable operators, and abstract node $B_4$ has $4 \times 8 = 32$ applicable operators. Thus $B_0 = 16$, $B_1 = 24$, $B_2 = 16$, $B_3 = 24$, $B_4 = 32$, $B_5 = 24$, $B_6 = 16$, $B_7 = 24$ and $B_8 = 16$, which are the 192 grounded operators.

Once the set of applicable operators for each abstract node is determined, operator grouping identifies, for each applicable operator, the abstract edge with which it is associated. An abstract edge (y, y') is an edge in the abstract graph that connects a pair of abstract nodes y and y', if and only if y' is a successor of y. From now on, y (y') is referred to as the source (destination) of abstract edge (y, y').

Further in this example, $\mathcal{O}_y$ will be the set of operators applicable to abstract node y. An operator $o \in \mathcal{O}_y$ is associated with an abstract edge (y, y') if and only if there exists two states x and x' in the original state space, such that (i) o is applicable to x, (ii) x' is the resulting state after applying o to x, and (iii) x and x' map to y and y', respectively. For operators with deterministic effects, it is easy to see that for every $o \in \mathcal{O}_y$, there is a unique abstract edge (y, y') that o is associated with. Essentially, there is a many-to-one mapping from the operator space to the abstract-edge space.

To exploit local structure in the operator space, edge partitioning uses operator grouping to divide the set of applicable operators $\mathcal{O}_y$ for abstract node y into operator groups, one for each successor of y in the abstract graph. An operator group $\mathcal{O}_{y,y'}$ is a subset of $\mathcal{O}_y$ that consists of all the operators that are associated with abstract edge (y, y'). Note that $\mathcal{O}_{y,y'} \cap \mathcal{O}_{y,y''} = \emptyset$ for all $y' \neq y''$, and $$\cup \mathcal{O}_{y,y'} = \mathcal{O}_y$$
$$y' \in \text{successors}(y)$$

where successors(y) is the set of successors of y in the abstract graph.

Although the technique of operator grouping is presented here in the context of searching implicitly-represented graphs (i.e., graphs represented by a start state and a set of operators for generating successors), it should be clear that the same technique applies with little modification to searching explicitly-represented graphs (i.e., graphs represented by a set of vertices and a set of edges).

So far, edge partitioning has been described independently of the external-memory graph search algorithm that uses it. Next described are two different versions of edge partitioning, one for hash-based delayed duplicate detection and one for structured duplicate detection.

3.2 Edge Partitioning for Hash-Based DDD

As previously explained, although hash-based DDD in its original form does not exploit or depend on the local structure of a graph, an important recent improvement, called "interleaving expansion and merging", does. To explain how edge partitioning can be used to improve the performance of hash-based DDD, considered first is how the kind of local structure exploited by "interleaving expansion and merging" is related to the kind of local structure exploited by SDD.

As previously pointed out, hash-based DDD requires a problem-specific hash function, and the "interleaving expansion and merging" technique is only effective when this hash function maps nodes to files in such a way that the nodes in one file (the child file) are generated from nodes in only a small number of other files (its parent files). In fact, these relationships can be represented by an abstract state-space graph in which abstract nodes correspond to files, and an abstract edge is present when nodes in one file have successor nodes in the other file. This should make it clear that the first hash function used by hash-based DDD is actually a statespace projection function, and, for "interleaving expansion and merging" to be effective, this hash function should capture the same kind of local structure that is exploited by SDD. The following concept will help make this more precise.

Definition 1: The predecessor-expansion scope of a child file for an abstract node y' under a state-space projection function Π corresponds to the union of nodes in the parent files for abstract nodes y ∈ predecessors(y'), that is, $$\cup \Pi^{-1}(y),$$
y∈predecessors(y')

where predecessors(y') is the set of predecessors of y' in the abstract graph, and $\Pi^{-1}(y)$ is the set of nodes in the parent file for an abstract node y.

An important property of the predecessor-expansion scope is that it is guaranteed to contain all stored predecessors of nodes in a child file, which leads to the following theorem.

Theorem 1: Merging duplicate nodes after expanding all nodes in the predecessor-expansion scope of a child file acts to eliminate all duplicates that could be generated for the child file.

The concept of predecessor-expansion scope lets the local graph structure needed by "interleaving expansion and merging" be identified in a principled way, and relate it to the kind of local structure exploited by SDD. For undirected graphs, they are exactly the same, since the set of predecessors of an abstract node always coincides with the set of its successors. For directed graphs, they may or may not be the same.

This analysis also lets a condition be specified under which "interleaving expansion and merging" will not be effective, at least by itself. When the abstract graph is fully connected, the predecessor-expansion scope of any child file is the entire set of parent files. This means the earliest time a child file can be merged is when all nodes at the current depth have been expanded, which prevents the application of interleaving expansion and merging. Next described is how edge partitioning allows "interleaving of expansion and merging" to be effective even in this case.

The idea is to force nodes within the predecessor expansion scope of a child file to generate successors only for that child file alone, without generating successor nodes for other child files at the same time. This can be achieved as follows. Let y' be the abstract node that corresponds to the child file that is the target of merging. To merge duplicate nodes in this file as early as possible, edge partitioning only uses operators o ∈ $O_{y,y'}$ to generate the successors of nodes in the parent files for abstract nodes y ∈ predecessors(y').

Once all nodes in the parent files have generated their successors for this child file, merging can take place as usual. The advantage of edge partitioning is that it saves external memory by not generating (possibly duplicate) successors for any other child files before merging is performed. After merging duplicates in a child file, edge partitioning picks another child file as the next merging target, until all the child files have been merged. It can be shown that by the time the last child file is merged, edge partitioning must have used all the operators to generate all the successor nodes for the current depth. But by doing so in a partial and incremental way, it ensures that the local structure needed by the "interleaving expansion and merging" technique is always present.

3.3 Edge Partitioning for SDD

Edge partitioning plays a different role in SDD than it does in hash-based DDD. In hash-based DDD, it helps to reduce the amount of disk storage that is needed. In SDD, it reduces the amount of internal memory that is needed. Recall that SDD has a minimum internal-memory requirement that corresponds to the largest duplicate-detection scope. Previously, this memory requirement could only be reduced by increasing the granularity of the state-space projection function. Although often effective in practice, this process for reducing the internal-memory requirement depends on being able to find appropriate structure in the graph, and is not guaranteed to work. Edge partitioning provides an alternative approach to reducing the internal-memory requirement of SDD, and is guaranteed to work even if the abstract graph used by SDD is fully connected.

It is to be recalled that the duplicate-detection scope of a node contains all stored nodes that map to the successors of the node's image in the abstract graph. Thus, a fully-connected abstract graph means that the duplicate-detection scope of any node must include all stored nodes, and SDD cannot use the disk and must store all nodes in RAM. In practice, and with a properly chosen state-space projection function, this worst-case scenario will not occur. But there could be cases in which the largest duplicate-detection scope is not significantly smaller than the entire set of stored nodes, simply because some graphs have less of this kind of local structure than others. With edge partitioning, SDD only needs to keep a small subset of stored nodes in RAM, no matter what the structure of the graph.

The idea of edge partitioning for SDD is to subdivide the duplicate-detection scope into smaller scopes, one for each abstract edge, and use only the operator group that is associated with the abstract edge to generate successors at a time. This leads to the concept of duplicate-detection scope for an abstract edge, which is defined as follows.

Definition 2: The duplicate-detection scope for an abstract edge is the set of stored nodes that map to the destination of the abstract edge.

The duplicate-detection scope for an abstract edge is guaranteed to contain only nodes that map to a single abstract node, regardless of the structure of the abstract graph. The following theorem follows from the definition.

Theorem 2: The duplicate-detection scope for an abstract edge contains all stored duplicates of the successors generated by applying its corresponding operator group to the set of nodes that map to the source of the abstract edge.

Theorem 2 guarantees that edge partitioning only needs to store a single nblock in RAM, in order to catch all the duplicates that could be generated, even in the worst case. This works in the following way. For each abstract edge (y, y'), edge partitioning uses operators $o \in O_{y,y'}$ to generate successors for nodes that map to abstract node y. After edge partitioning has expanded these nodes using one operator group, it uses a different operator group $O_{y,y''}$ to generate successors for the same nblock, until all operator groups have been used in generating successors for the nblock. Then it chooses a different nblock to expand next.

Because not all successors are generated by edge partitioning when a node is expanded, a node expansion in edge partitioning is called an incremental expansion. Of course, an incremental expansion is much cheaper than a full expansion that uses all applicable operators. By performing a sequence of incremental expansions, nodes eventually become fully expanded. By expanding nodes in a partial and incremental way, it is possible to create a form of locality that can be exploited by SDD to localize memory references.

The following example is used to illustrate how edge partitioning works in SDD. Let $x_i$ be a search node that represents a state of the Eight Puzzle 70 with the blank located at position i as shown in FIG. 9. Suppose there are only two stored nodes $\{a_0, b_0\}$ that map to abstract node $B_0$. Let $\{a_1, a_3\}$ and $\{b_1, b_3\}$ be the successors of $a_0$ and $b_0$, respectively. (The subscript encodes the position of the blank.) When edge partitioning expands nodes $a_0$ and $b_0$ it first uses operators $o \in O_{B_0,B_1}$. This corresponds to moving the blank to the right, to generate the first two successor nodes $a_1$ and $b_1$. Note that only nodes that map to abstract node $B_1$ need to be stored in RAM when $a_1$ or $b_1$ is being generated. Next, edge partitioning uses operators $o \in O_{B_0,B_3}$, which correspond to moving the blank down, to generate the third and fourth successor nodes $a_3$ and $b_3$. This time, only nodes that map to abstract node $B_3$ need to be stored in RAM.

While the technique of edge partitioning is presented in the context of external-memory graph search, it should be clear that this technique is designed for and applicable to any computer system with a memory hierarchy, of which RAM and disk are just two example levels. In essence, edge partitioning is about how to make communication, such as data transfer via I/O operations, efficient between different levels of the memory hierarchy in which faster (but possibly smaller-capacity) memory is complemented by slower (but possibly larger-capacity) memory Edge partitioning can be utilized to reduce other communication overheads besides disk I/O operations. For example, an algorithm that employs the idea of edge partitioning can view CPU (or L2; i.e., Level 2 memory, which may be a memory external to the microprocessor, although in newer microprocessors L2 caches may be included into the microprocessor architecture) cache as a kind of faster but smaller-capacity memory, regular RAM as a kind of slower but larger-capacity memory, and a cache-miss-then-fetch-from-RAM operation as a disk I/O operation. Although the speed difference between cache and RAM may not be as great as the difference between RAM and disk, significant speedups in internal-memory search can be achieved in a similar way that edge partitioning speedups external-memory search. As another example that edge partitioning can reduce the communication overhead, consider in a distributed computing environment in which a computer needs to access information that is stored in another computer's memory (be it internal or external memory) via a computer network. Because of network delay, it is more time-consuming to access information stored in another computer's memory than information stored locally. In this example, if a search algorithm views the local memory of a computer as a kind of faster memory, the memory of other computers in the network as a kind of slower memory, and network communication as time-consuming operations like disk I/Os, then it can employ edge partitioning to reduce the overhead of network communication while performing graph search that requires exchanging information between computers in the network.

It is also to be understood that a program or an operating system may not have total control over which level of memory hierarchy is used to store nodes or copies of the nodes. For example, in the case of CPU (microprocessor) and/or L2 cache, edge-partitioning techniques can be used to influence or bias a system so as to achieve or stimulate the effect of storing nodes within the current duplicate detection scope in one level of the memory hierarchy and other nodes in another level of the hierarchy. Therefore, nodes within the current duplicate-detection scope may or may not be stored in one level of the memory hierarchy, and nodes outside of the current duplicate-detection scope may or may not be stored in another level of the hierarchy. But as long as (1) an above-average percentage of nodes within the current duplicate-detection scope is stored in one (faster) level of the memory hierarchy, and/or (2) an above-average percentage of nodes outside of the current duplicate-detection scope is stored in another (slower) level of the memory hierarchy, performance gains (e.g., speed) can still be achieved by using techniques of edge partitioning.

4. Implementation

Before presenting computational results, reviewed are the key steps in implementing SDD and then discussed are some strategies for implementing SDD with edge partitioning in an efficient way.

First, before the search begins, SDD uses a state-state projection function to create an abstract graph that is intended to capture local structure in the original search graph. The state-space projection function partitions stored nodes into nblocks (one for each node in the abstract graph) that can be moved between RAM and disk, and so each nblock must be able to fit in RAM. The state-space projection function can be hand-crafted or automatically generated.

Like delayed duplicate detection, SDD is designed to be used as part of a search algorithm that expands a set of nodes at a time, such as the frontier nodes in breadth-first search. The idea of SDD is to expand these nodes in an order that minimizes disk I/O. This is accomplished by expanding nodes with the same duplicate-detection scope consecutively, and minimizing changes of duplicate-detection scope during expansion of all nodes. A simple and effective heuristic is to expand nodes in order of nblock, with nblocks ordered according to a breadth-first traversal of the abstract graph. When RAM is full, SDD needs to decide which nblocks to move from RAM to disk. A simple and effective heuristic is to write the least-recently used nblocks to disk.

SDD with edge partitioning uses a similar strategy of trying to minimize changes of duplicate-detection scope during expansion of a set of nodes. The difference is that it considers the duplicate-detection scope for an abstract edge, and this requires incremental node expansion. A simple and effective heuristic is to apply operators to nodes in order of nblock, and, for each nblock, in order of outgoing abstract edge.

To reduce the overhead of operator grouping, the current implementation uses a lazy approach in which operator grouping for an abstract node is only computed immediately before the first time a node that maps to it is expanded. Because there could be a number of abstract nodes that do not have any nodes that map to them during search, this approach avoids computing operator grouping for these abstract nodes. It has been observed that the effectiveness of this approach tends to increase with the size of the abstract graph.

This implementation also uses a lazy approach to reading nodes from disk. Upon switching to a duplicate-detection scope that consists of nodes stored on disk, the current implementation does not read these nodes from disk immediately. Instead, it waits until the first time a node is generated. The reason for this is that when a single operator group is used to generate successors for nodes in an nblock, it may not generate any successor node, if (i) the nodes to which the operators in the group are applicable have not yet been generated, or (ii) the generated successor nodes have an f-cost greater than an upper bound used in branch-and-bound search. The lazy approach avoids the overhead of reading nodes from disk (in order to setup the duplicate-detection scope in RAM) if no successors are generated by an operator group for an nblock at a particular depth. Thus, in this duplicate detection scheme, a set of nodes stored in external memory are read (or swapped) into internal memory only when a node is generated that could potentially be a duplicate of one of the nodes in the set. For a node to be considered as "generated" in a branch-and-bound search, it must not be pruned immediately by the branch-and-bound search (i.e., a lower bound estimate of the cost of a solution path passing through the node must not be greater than the current upper bound used by the branch-and-bound search).

As previously discussed, SDD needs to decide which nblocks to move from RAM to disk, when RAM is full. Except for the nblocks that make up the current duplicate-detection scope, any nblocks can potentially be flushed to disk. But this means if an nblock does not include itself as part of its own duplicate-detection scope, it may be flushed to disk even when its nodes are being expanded. While this is allowed in the current implementation, it should be avoided as much as possible for efficiency reasons. Two simple modifications are made to the least-recently used algorithm to ensure this. First, instead of updating the time stamp of an nblock every time it is accessed, its time stamp is only updated when (a) the current duplicate-detection scope changes and (b) the nblock is the next to be expanded or is part of a new duplicate-detection scope. This also simplifies the maintenance of the clock, which needs no updates until the duplicate-detection scope changes. The second modification is that instead of moving forward the clock by one clock tick when the duplicate-detection scope changes, our algorithm advances it by two clock ticks. Then the time stamp of the to-be-expanded nblock is set to one clock tick earlier than the new clock time. Finally, the time stamps of all the nblocks within the new duplicate-detection scope are updated to the new clock time. As a result, if the nblock to be expanded next does not belong to the new duplicate-detection scope, it is the last to be flushed to disk, since its time stamp is more recent than any other flushable nblock and earlier than any non-flushable nblock, which has a time stamp equal to the current clock time.

Finally, recall that edge partitioning expands nodes in a single nblock multiple times, one for each operator group. This affects the strategy with which to remove nodes stored on disk for the currently-expanding nblock. While the simplest strategy is to remove these nodes from disk as soon as they are swapped into RAM, it may incur extra overhead if these nodes must be written back to disk shortly after, in order to make room for newly-generated nodes. Note that nodes in the currently-expanding nblock do not change as long as the operator group used to generate the successors is not associated with an abstract edge whose source and destination are the same (i.e., a "self loop"). Because self loops are easy to detect, the current implementation postpones the removal of nodes stored on disk for the currently-expanding nblock until a "self loop" operator group, which (if any) is always the last operator group applied to an nblock in the current implementation, is used to expand the nblock.

5. Computational Results

Figure 10:
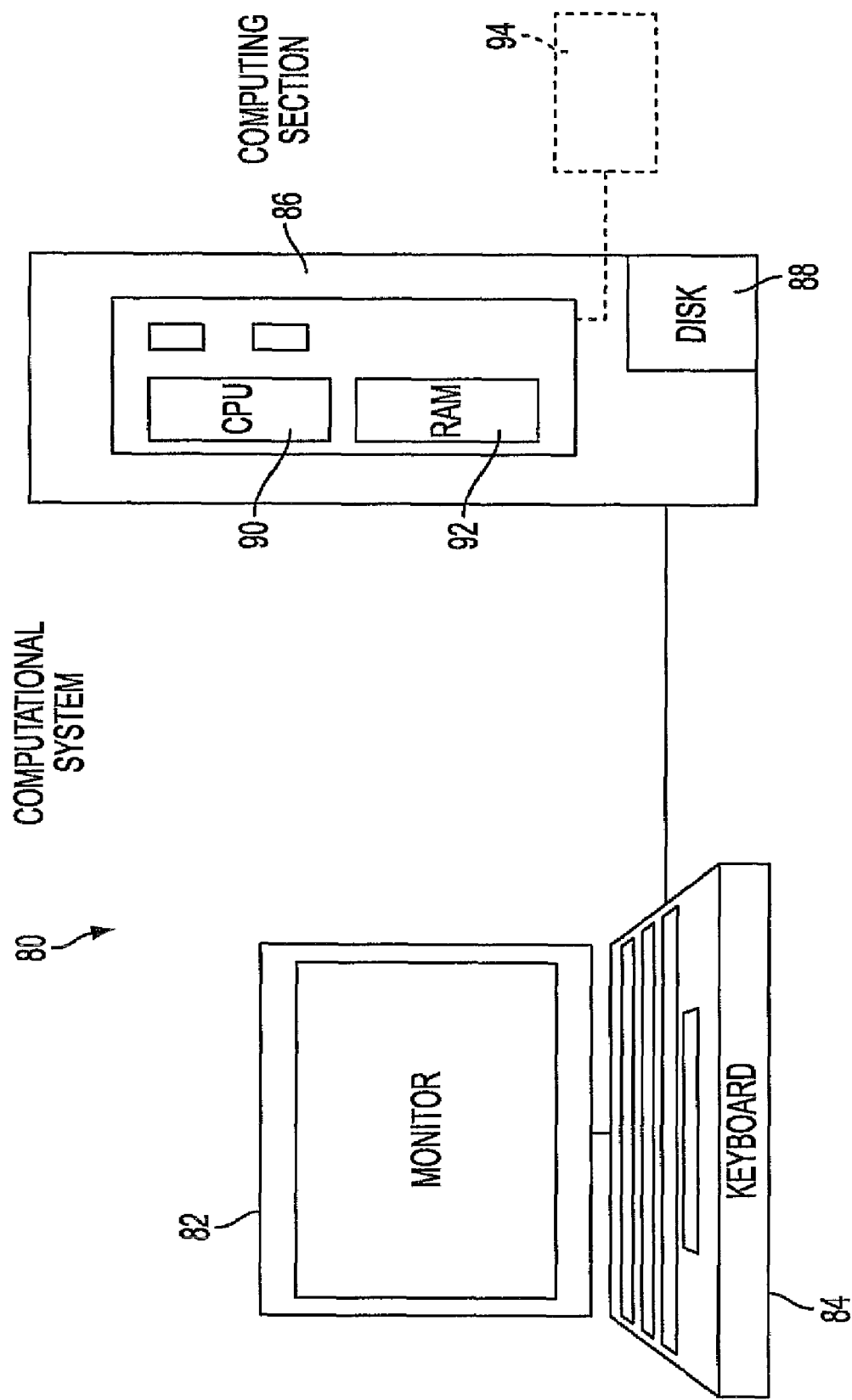
FIG. 10 depicts a system in which concepts of the present application may be employed.

Concepts described herein may be implemented on a variety of computational systems. An example of one such computational system 80 is shown in FIG. 10, which includes, among other components, a monitor 82, keyboard 84 computing section, 86 and external memory such as disk 88. Computing section 86 includes components such as a CPU or other computational component 90, and internal memory 92, such as a RAM. It is of course to be understood computing section 86 may include other components and may be designed in other configurations than shown here. External memory 88 is considered external, as it is external to computing section 86, which results in much slower I/O operations, as compared to internal memory 92. Also, disk 88 may or may not be physically enclosed with computing section 86, as illustrated by optional disk 94. For example, the optional disk 94 might be a network drive.

SDD with edge partitioning has been experimentally implemented within a domain independent STRIPS planner that uses breadth-first heuristic search as its underlying search algorithm. The reason for using breadth-first heuristic search is that it uses internal memory very efficiently. Building SDD with edge partitioning on top of it improves the overall efficiency of search by limiting the need to access disk.

A search algorithm used in connection with the present concepts may use regression planning to find optimal sequential plans. As an admissible heuristic, it may use a max-pair heuristic. The external-memory STRIPS planner was tested in ten different domains. Experiments were performed on an AMD Operton 2.4 GHz processor with 4 GB of RAM and 1 MB of L2 cache.

FIG. 11 compares the performance of SDD without edge partitioning 100 and with edge partitioning 102. The ten problems 104 are among the largest in each of the ten planning domains that SDD has been used to solve by itself without (i) using more than 2 GB of RAM and/or (ii) taking more than 2 CPU days of running time. Problems 104 are well known in the graph search arts, and therefore a detailed explanation of each is not set out in detail. Two problems (trucks-10 and depots-10) can only be solved within these limits using edge partitioning. For these two domains, FIG. 11 also includes the largest instances that can be solved without edge partitioning. Both versions of SDD use the same state-space projection function.

The table of FIG. 11 identifies some interesting results. First, it shows that edge partitioning can reduce the internal-memory requirements (e.g., RAM) of SDD by an average factor of 12 times for these planning problems (e.g., see RAM requirement for problems gripper-8, elevator-15, and satellite-7, etc.). Application of edge partitioning only increased the peak number of nodes stored on disk by about 7% (see the Disk columns for SDD and SDD+Edge Partitioning). Second, it shows the overhead that results from using an incremental (and/or partial) approach to expanding nodes is rather inexpensive. Although on average there are 16.8 times as many incremental expansions when edge partitioning is used as there are full expansions when it is not, this only increases running time by 53% on average (see, Secs (seconds) columns). It is to be noted that the extra time taken by edge partitioning includes time for operator grouping.

Indirectly, the table shows roughly how much memory is saved by using SDD with edge partitioning instead of A*. The number of full node expansions in SDD gives a rough estimate of how many nodes A* would need to store in order to solve the problem, since A* has to store every node it expands, and breadth-first heuristic search (with an optimal upper bound) typically expands the same number of nodes as A*, disregarding ties. Based on the numbers shown in FIG. 11, A* would need, on average, at least 1,340 times more internal memory than SDD with edge partitioning in solving these problems. Because this estimate ignores the memory needed by A* to store an Open list, which is usually larger than a Closed list, this is probably a significant underestimate of the true savings.

Finally, it is useful to mention that SDD without edge partitioning is already very effective in solving these STRIPS planning problems, which indicates that these search problems contain a great deal of the kind of local structure that SDD exploits. This means that these problems actually present a serious challenge for edge partitioning, which must identify additional structure that can be exploited to reduce internal memory requirements even further. For search problems for which SDD without edge partitioning is less effective, SDD with edge partitioning is likely to reduce internal memory requirements by a much larger ratio.

Since edge partitioning is effective even when the abstract graph used by SDD does not capture any local structure, one might wonder whether such local structure is useful anymore. Although it is no longer needed to reduce internal memory requirements, it is still useful in reducing time complexity. First of all, if a problem can be solved by SDD without edge partitioning, the time overhead of incremental node expansion can be avoided. If edge partitioning is used, then the more local structure (i.e., the fewer successor nodes of an abstract node in the abstract graph), the fewer incremental expansions are needed before a node is fully expanded, and the overhead of incremental node expansion is reduced. The results in FIG. 11 show that edge partitioning reduces the amount of internal memory needed in exchange for an increase in average running time, although the actual increase is still fairly modest.

The foregoing discloses a method and system, called edge partitioning, that improves the scalability of structured approaches to external-memory graph search by using a strategy of partial and incremental node expansion to localize memory references in duplicate detection. Edge partitioning can be viewed as a form of operator grouping that can be combined with earlier approaches to external-memory graph search that use state abstraction to localize memory references. Results show that it significantly reduces the internal memory requirements of SDD. It is also guaranteed to be effective regardless of the structure of the graph. Finally, it can be used to reduce the amount of disk storage needed by DDD. Although empirical results for this have not been presented, this analysis helps to clarify the relationship between SDD and DDD.

In alternative embodiments, instead of using one operator group at a time, edge partitioning can use multiple (but not all) operator groups to generate successor nodes at a time. If enough internal memory is available, this can reduce the overall number of incremental expansions. With edge partitioning, there are now two options available to reduce the internal-memory requirements of SDD. Either the granularity of the state-space projection function can be increased, or edge partitioning can be used.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for generating successor nodes in an external-memory search of a graph having a plurality of nodes and outgoing edges of the plurality of nodes, the method comprising:
    generating a plan representing actions to be taken in a physical environment to solve real world problems, the plan being at least partially represented by a graph having nodes identifying the potential actions to be taken;
    constructing an abstract representation of the graph to include a set of abstract nodes and abstract edges of the graph;
    partitioning the outgoing edges of the graph based on the abstract representation of the graph, the partitioning including grouping edges that map to a same abstract edge of the abstract representation together as isomorphic edges;
    using only one group of isomorphic edges at a time to generate successors consecutively for a set of nodes that map to the same abstract edge;
    choosing a different group of isomorphic edges once the edges in a previous group have been used to generate successors, until a goal node is found or other termination condition is met;
    searching, by a computer, the graph using the abstract representation of the graph;
and
    retrieving a result representing a solution to the real world problem based on the search.

2. The method of claim 1, wherein instead of using only one group of isomorphic edges at a time to generate successors:
    using two or more groups of isomorphic edges at a time to generate successor nodes for a set of nodes that map to the same abstract node.

3. The method of claim 2, wherein following the generation of the successor nodes using one or more groups of isomorphic edges:
    using a different number of remaining groups of isomorphic edges to generate successor nodes, wherein the number of groups of isomorphic edges used to generate successor nodes at a time does not need to be the same and can vary from time to time during the search.

4. The method of claim 3, wherein the steps of constructing an abstract representation of the graph involves the use of edge partitioning, as can occur in a hierarchical approach to edge partitioning.

5. The method of claim 4, further including:
    employing the edge partitioning in a structured duplicate detection process.

6. The method of claim 5, wherein a set of nodes stored in external memory are read or swapped into internal memory only when a node is generated that could potentially be a duplicate of one of the nodes in the set, wherein for a node to be considered as generated in a branch-and-bound search, it must not be pruned immediately by the branch-and-bound search, which means a lower-bound estimate of a cost of a solution path passing through the node must not be greater than a current upper bound used by the branch-and-bound search.

7. The method of claim 5, wherein an implementation of a least-recently used strategy, with which to move nodes outside of a current duplicate-detection scope from internal memory to external memory, maintains a clock that ticks only when the current duplicate-detection scope changes, wherein by this implementation, a set of nodes that map to the same abstract node share the same time stamp, which is updated only when (a) the current duplicate-detection scope changes and (b) the node set is the next to be expanded or is part of a new duplicate-detection scope.

8. The method of claim 7, wherein the clock moves two or more ticks forward, every time the current duplicate-detection scope changes, the two or more ticks leaving enough space, measured in terms of clock ticks, between a new time and a previous time such that it allows the time stamp of a to-be-expanded set of nodes to be updated as one or more clock tick(s) earlier than a new clock time yet still later than a previous clock time, in order to retain the set of nodes in internal memory for a longest time among all sets of nodes that can be potentially stored in external memory, doing so thereby reducing a number of inputs/outputs (I/O) or other communication operations in cases where the to-be-expanded node set is not part of a new duplicate-detection scope.

9. The method of claim 5, wherein a last operator group used to generate the successors for a set of nodes that map to the same abstract node is associated with an abstract edge whose source and destination are the same, including a "self-loop", in order to improve a performance of the search algorithm, including but not limited to reducing a number of input/output (I/O) operations.

10. The method of claim 4, further including
employing the edge partitioning in a delayed duplicate detection process.

11. The method of claim 4, further includes using the edge partitioning with a structured duplicate detection process, wherein the edge partitioning for structured duplicate detection includes subdividing a duplicate-detection scope into smaller scopes, one for each abstract edge, and using only an operator group that is associated with an abstract edge to generate successor nodes.

12. The method according to claim 11, wherein the duplicate-detection scope for an abstract edge is a set of stored nodes that map to a destination of the abstract edge, and the duplicate-detection scope for the abstract edge is guaranteed to contain only nodes that map to a single abstract node, regardless of a structure of the abstract graph.

13. The method of claim 12, wherein a duplicate-detection scope for the abstract edge contains all stored duplicates of the successors generated by applying its corresponding operator group to the set of nodes that map to a source of the abstract edge.

14. The method of claim 1, wherein following the generation of the successor nodes using one or more groups of isomorphic edges:
using a different number of remaining groups of isomorphic edges to generate successor nodes, wherein the number of groups of isomorphic edges used to generate successor nodes at a time does not need to be the same and can vary from time to time during the search.

15. The method of claim 14, wherein the generation of successor nodes is accomplished as a mixture of partial or incremental node expansions, and full node expansions.

16. The method of claim 1, wherein the generation of the successor nodes includes using a state-space projection function and/or other edge-partitioning technique that is used in a hierarchical or recursive fashion.

17. The method of claim 1, wherein the abstract representation of the graph is a fully-connected abstract state graph.

18. The method of claim 1, wherein the group of isomorphic edges presently being used to generate the successor nodes are stored in a random-access memory internal to a computing system, and the groups of isomorphic edges not presently being used to generate successor nodes are stored in a memory external to the computing system.

19. The method of claim 1, wherein at any one point in time there is a single set of nodes that map to a same abstract node stored in internal memory, when an abstract search graph has two or more abstract nodes.

20. The method of claim 19, wherein instead of storing a single set of nodes, two or more sets of nodes are stored in internal memory.

21. The method according to claim 1, wherein the partitioning step includes using an operator-grouping procedure to divide a set of applicable operators ($O_y$) for an abstract node (y) into operator groups, one for each successor of (y) in the abstract graph, and wherein an operator group ($O_{y,y'}$) is a subset of the applicable operators ($O_y$) that consists of all the operators that are associated with the abstract edge (y, y').

22. The method of claim 21, wherein the operator-grouping procedure is only performed for an abstract node (y) immediately before the first time a node that maps to the abstract node (y) is expanded.

23. The method of claim 1, wherein a predecessor-expansion scope of a child file for an abstract node y' under a state-space projection function Π corresponds to a union of nodes in parent files for abstract nodes y ∈ predecessors(y'), that is, $$\cup \Pi^{-1}(y),$$

y∈predecessors(y'),
where predecessors(y') is the set of predecessors of y' in the abstract graph, and $\Pi^{-1}(y)$ is a set of nodes in the parent file for an abstract node y.

24. The method of claim 23, wherein a property of the predecessor-expansion scope is that it is guaranteed to contain all stored predecessors of nodes in the child file, and wherein merging duplicate nodes after expanding all nodes in the predecessor-expansion scope of the child file acts to eliminate all duplicates that could be generated for the child file.

25. A system for generating successor nodes in an external-memory search of a graph having a plurality of nodes and outgoing edges, the system comprising:
a plan representing actions to be taken in a physical environment to solve real world problems, the plan being at least partially represented by a graph having nodes identifying the potential actions to be taken;
a computing system having computer instructions on a computer readable medium, an internal memory and an external memory, the computer instructions programmed to:
construct an abstract representation of the graph to include a set of abstract nodes and abstract edges of the graph;
partition the edges of the graph based on the abstract representation of the graph by grouping edges that map to the same abstract edge of the abstract representation together as isomorphic edges; and
use one or more group(s) of isomorphic edges to generate successor nodes for a set of nodes that map to the same abstract node at a time, wherein nodes within a current duplicate-detection scope are stored in internal memory, and nodes outside of the current duplicate-detection scope can, but do not have to, be stored in external memory search the graph using the abstract representation of the graph; and retrieve a result representing a solution to the real world problem based on the search.

26. The system of claim 25, wherein nodes within the current duplicate-detection scope are stored in one level of a memory hierarchy, and some or possibly all nodes outside of the current duplicate-detection scope are stored in another level of the hierarchy.

27. The system of claim 26, wherein a program or an operating system does not have total control over which level of the memory hierarchy is used to store the nodes or copies of the nodes, as is the case of a CPU or L2 cache, techniques are used to influence or bias the system so as to achieve or stimulate an effect of storing nodes within the current duplicate-detection scope in one level of the memory hierarchy, and some or possibly all nodes outside of the current duplicate-detection scope in another level of the hierarchy.

* * * * *